(No Model.)
D. E. TEAL.
COMBINED CAR AND ELEVATOR.
No. 301,304. Patented July 1, 1884.
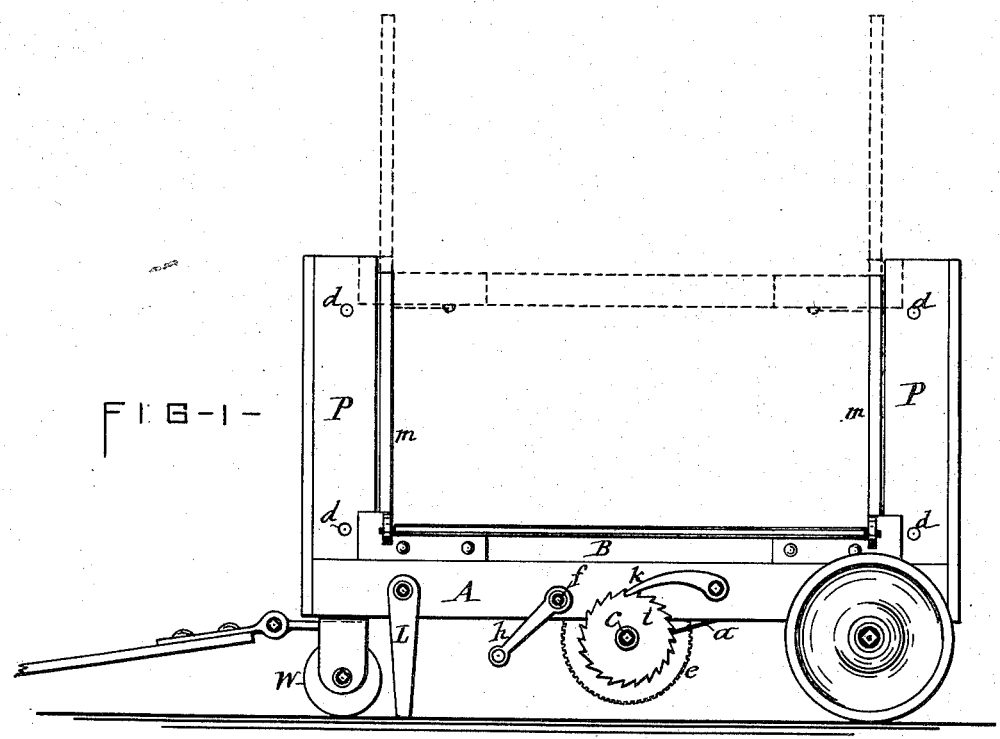
Fig-1-
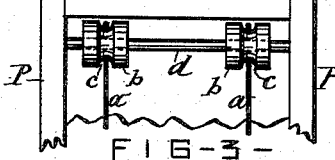
Fig-3-
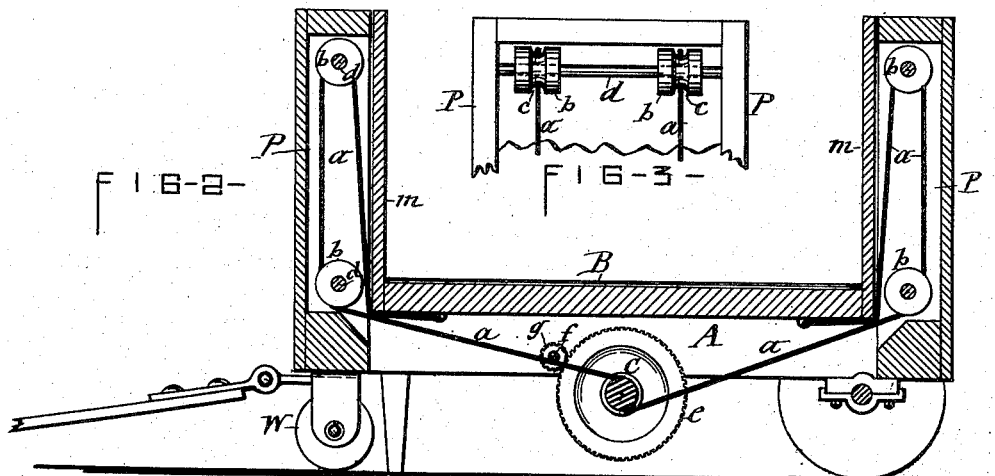
Fig-2-
ATTEST—
Geo. E. Raymond
F. H. Gibbs
INVENTOR—
Daniel E. Teal
per Duell, Laass & Hey
Attys

UNITED STATES PATENT OFFICE.

DANIEL E. TEAL, OF ONEIDA CASTLE, NEW YORK.

COMBINED CAR AND ELEVATOR.

SPECIFICATION forming part of Letters Patent No. 301,304, dated July 1, 1884.

Application filed February 7, 1884. (No model.)

*To all whom it may concern:*

Be it known that I, DANIEL E. TEAL, of Oneida Castle, in the county of Oneida, in the State of New York, have invented new and useful Improvements in a Combined Car and Elevator, of which the following, taken in connection with the accompanying drawings, is a full, clear, and exact description.

This invention relates to a combined truck or car and elevator designed to facilitate the transfer of baggage or heavy articles from the platform or floor of depots and warehouses to cars or wagons to be loaded.

The invention consists, essentially, in the combination, with a truck or car, of a platform mounted movably thereon, and mechanism for raising and lowering the platform on the truck; and it also consists in certain peculiarities of the details of the combined truck and elevator, as hereinafter more fully described, and specifically set forth in the claims.

In the annexed drawings, Figure 1 is a side elevation of the combined truck and elevator. Fig. 2 is a longitudinal section of the same; and Fig. 3 is a detached view of the upper portion of one end of the truck, illustrating the arrangement of the sheaves carrying the cables or chains by which the movable platform is raised and lowered on the truck.

Similar letters of reference indicate corresponding parts.

A represents a low truck similar to those usually employed about railway-depots for transferring baggage from the baggage-room to the baggage-cars, the forward end of said truck being usually supported by a single wheel, W, journaled on a pedestal pivoted in the center of the said end of the truck, so as to facilitate the turning of the truck abruptly about when required. By means of legs L, pivoted to opposite sides of the forward end of the truck and adapted to be set in a vertical position, the aforesaid end of the truck is sustained in a horizontal position while being loaded or unloaded.

To the four corners of the truck-frame are rigidly secured upright posts P P, which serve as vertical guides for a platform, B, which is movably mounted on the truck-frame. Beneath this platform is a winch, C, journaled on the truck-frame, and having secured to it chains or cables $a$ $a$, which are extended to opposite ends of the truck, and pass over sheaves $b$ $b$, mounted on horizontal shafts $d$, secured between the end posts near the upper and lower ends thereof. From the upper sheaves, $b$, the cables are extended to and securely fastened on the bottom of the platform B, as illustrated in Fig. 2 of the drawings. The sheaves $b$ $b$ are provided with a circumferential groove, $c$, in which the cable runs, as shown in Fig. 3 of the drawings. In order to allow the said sheaves to accommodate themselves in their position to the lateral shifting of the cable incident to its winding around the winch C, I mount the sheaves movable laterally on their respective shafts $d$, thus obviating undue friction and abrasion of the cable and sheaves.

To facilitate the operation of raising the platform B, I attach to the winch C a spur-wheel, $e$, and arrange parallel with the winch a counter-shaft, $f$, to which I attach a small pinion, $g$, the power being transmitted to the winch by a crank, $h$, connected to the counter-shaft. A ratchet-wheel, $i$, fixed to the axle of the winch, and a pawl, $k$, connected to the truck-frame and adapted to engage the ratchet-wheel, serve to prevent the reverse movement of the winch, and thus the platform B is retained in an elevated position when required. To the ends of the movable platform I secure vertical walls $m$, which serve to shield the sheaves $b$ $b$ and their shafts when the platform rests on the truck, as illustrated in Figs. 1 and 2 of the drawings.

It will be observed that by means of my invention heavy baggage or goods can be conveniently loaded onto the truck and conveyed to either a baggage-car or a road-wagon, where, by elevating the platform B to a proper height, the load can be easily transferred from the elevated platform to the said car or wagon.

Having thus fully described my invention, what I claim as new, and desire to secure by Letters Patent, is—

1. The combination, with a truck or car, of a platform mounted movably thereon, and mechanism for raising and lowering the platform on the truck, substantially as set forth.

2. The combination, with a truck, of a platform mounted movably thereon, mechanism for raising and lowering the platform on the truck, and guides for sustaining said platform in its said movement, substantially as specified.

3. The combination, with a truck-frame, of posts mounted thereon, a platform arranged movable vertically between said posts, sheaves mounted on axles secured to the posts, a winch connected to the truck-frame, and chains or cables passing over the sheaves and connected with the winch and movable platform, substantially as and for the purpose set forth.

4. The combination, with a truck-frame, of posts mounted thereon, a platform arranged movable vertically between the posts, horizontal shafts sustained between the posts, sheaves mounted movable laterally on said shafts and provided with a circumferential groove, a winch connected to the truck-frame, and chains or cables extended from the winch over the sheaves, and connected to the movable platform, all constructed and combined substantially in the manner described and shown.

In testimony whereof I have hereunto signed my name and affixed my seal, in the presence of two attesting witnesses, at Syracuse, in the county of Onondaga, in the State of New York, this 2d day of February, 1884.

DANIEL E. TEAL. [L. S.]

Witnesses:
FREDERICK H. GIBBS,
WM. C. RAYMOND.